US007615885B2

(12) United States Patent
Puschkat

(10) Patent No.: US 7,615,885 B2
(45) Date of Patent: Nov. 10, 2009

(54) POWER CONNECTION DEVICE FOR BATTERY TERMINAL CLAMP

(75) Inventor: Peter Puschkat, Waltrop (DE)

(73) Assignee: Lear Corporation, Southfield, MI (US)

( * ) Notice: Subject to any disclaimer, the term of this patent is extended or adjusted under 35 U.S.C. 154(b) by 175 days.

(21) Appl. No.: 11/668,860

(22) Filed: Jan. 30, 2007

(65) Prior Publication Data

US 2007/0267917 A1 Nov. 22, 2007

(30) Foreign Application Priority Data

Jan. 31, 2006 (DE) ...................... 10 2006 004 337

(51) Int. Cl.
*B60L 1/00* (2006.01)

(52) U.S. Cl. ..................................................... 307/10.1

(58) Field of Classification Search ................. 307/10.1
See application file for complete search history.

(56) References Cited

U.S. PATENT DOCUMENTS

| | | | | | |
|---|---|---|---|---|---|
| 4,000,408 | A | | 12/1976 | McCartney | |
| 5,567,991 | A | * | 10/1996 | Schantz et al. | 307/10.1 |
| 5,869,951 | A | | 2/1999 | Takahashi | |
| 6,049,140 | A | * | 4/2000 | Alksnat et al. | 307/10.2 |
| 6,087,737 | A | * | 7/2000 | Alksnat et al. | 307/10.7 |
| 6,111,327 | A | * | 8/2000 | Bae | 307/10.7 |
| 6,144,110 | A | | 11/2000 | Matsuda et al. | |
| 6,433,442 | B1 | * | 8/2002 | Mackel et al. | 307/10.7 |
| 6,843,157 | B2 | * | 1/2005 | Hamilton et al. | 83/639.4 |
| 7,291,024 | B2 | * | 11/2007 | Kiyota et al. | 439/76.2 |
| 2004/0251858 | A1 | * | 12/2004 | Asao et al. | 318/139 |

FOREIGN PATENT DOCUMENTS

| | | | |
|---|---|---|---|
| EP | 0628980 | A1 | 5/1994 |
| EP | 1621410 | A2 | 2/2006 |
| GB | 2321749 | A | 8/1998 |
| SU | 1202925 | A | 5/1984 |
| WO | 9423970 | A1 | 10/1994 |

OTHER PUBLICATIONS

Search and Examination Report for corresponding Application No. GB0701469.9, mailed May 25, 2007, 6 pages.
Great Britain Search Report for corresponding Application No. GB0701469.9, mailed Feb. 19, 2009, 3 pages.

* cited by examiner

*Primary Examiner*—Albert W Paladini
*Assistant Examiner*—Michael Rutland Wallis
(74) *Attorney, Agent, or Firm*—Brooks Kushman P.C.

(57) ABSTRACT

A power connection device for installation on a terminal post, such as but not limited to a terminal post associated with a terminal of a battery of a motor vehicle. The power connection device may include a tolerance compensation device having capabilities to facilitate positioning of the power connection device relative to the battery terminal post and an outer packaging or surface of the battery.

9 Claims, 1 Drawing Sheet

POWER CONNECTION DEVICE FOR BATTERY TERMINAL CLAMP

CROSS-REFERENCE TO RELATED APPLICATIONS

This application claims priority to German Application No. 10 2006 004 337.5, filed on Jan. 31, 2006, the disclosure of which is hereby incorporated in its entirety.

BACKGROUND OF THE INVENTION

1. Field of the Invention

The present invention relates to battery terminal clamps, including but not limited to devices connected thereto.

2. Background Art

A power connection device may be configured to electrically connect a battery to a battery load. The power connection device may be configured for use in any number of environments, such as but not limited to electrically connecting a vehicle battery to vehicle loads. The power connection device may include any number of elements and/or features to facilitate the electrical connection, including but not limited to a detonatable battery terminal clamp, a transport disconnect switch, a power distribution rail, and/or load connections.

In the state of the vehicle as delivered from the factory, the power distribution rail may be electrically connected to a battery terminal via the detonatable battery clamp and disconnect switch. The detonatable battery clamp may include a fuse composition type feature, which by means of a corresponding electrical device, may be activated and detonated in the event of an accident (collision) to prevent electrical transfer between the battery terminal and loads.

The transport disconnect switch may be a removable device integrated between the battery terminal and the power distribution rail. The power disconnect switch may be configured to permanently disconnect the battery terminal from the power distribution rail so that, for example, during delivery transport of the vehicle from the manufacturer to the dealer, the battery is unable to supply electrical power to the batty loads, thereby shutting off power to the electrical and electronic consumers.

This battery connection system requires at least three screwing operations during vehicle assembly, namely, screwing the detonatable battery terminal clamp onto the battery terminal, screwing on the transport disconnect switch, and screwing on the power distribution rail.

The dealer must remove the transport disconnect switch in order to make the vehicle operable. This requires unscrewing the power distribution rail, unscrewing and removing the transport disconnect switch, and screwing the power distribution rail back on. In addition, the dealer must dispose of the transport disconnect switch or send it back to the manufacturer. This can be problematic for the dealers and/or other individuals charged with similar processing.

BRIEF DESCRIPTION OF THE DRAWINGS

The present invention is pointed out with particularity in the appended claims. However, other features of the present invention will become more apparent and the present invention will be best understood by referring to the following detailed description in conjunction with the accompany drawings in which:

DETAILED DESCRIPTION OF THE PREFERRED EMBODIMENT(S)

Figure 1:
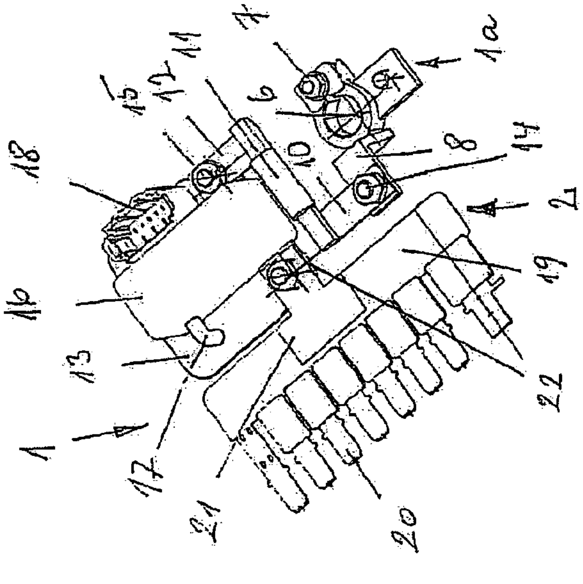
FIG. 1 illustrates a power connection device in accordance with one non-limiting aspect of the present invention.

FIG. 1 illustrates a power connection device 1 in accordance with one non-limiting aspect of the present invention. The power connection device 1 may include any number of feature and/or elements to facilitate transmitting, relaying, and/or otherwise processing energy received from a terminal of a battery (not shown). The power connection device 1 may be include a plurality of electrical and electronic components to facilitate the transmission of power from a battery terminal clamp 1*a,* clamped to the battery terminal, to a power distribution system 2.

Figure 2:
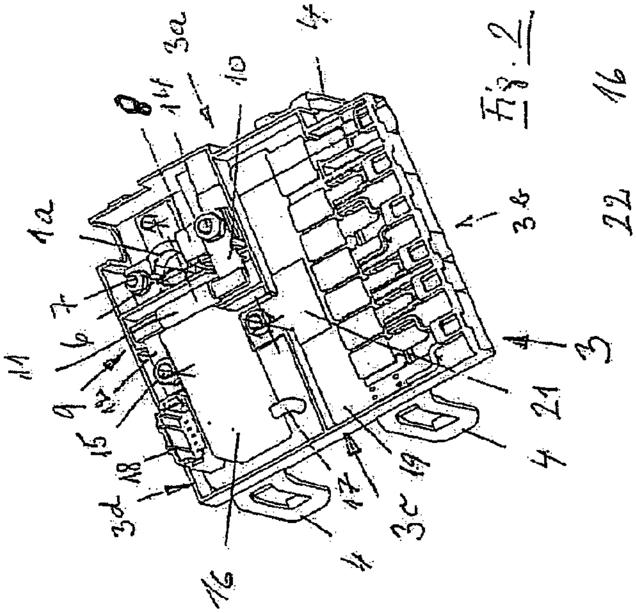
FIG. 2 illustrates the power connection device including a mounting plate in accordance with one non-limiting aspect of the present invention.

FIG. 2 illustrates the power connection device 1 including a mounting plate 3. The mounting plate 3, which may be an essentially rectangular or non-rectangular carrier made of plastic or other suitable material, may be configured to support or otherwise carry one or more of the components associated with the power connection device 1. The mounting plate 3 may form include features, such as but not limited to locking clips 4, for securing or otherwise interlocking with corresponding locking features on the battery (not shown). For reference, the mounting plate 3 may include the four outer edges 3*a,* 3*b,* 3*c,* and 3*d.*

The power connection device 1 may be fastened and/or locked to a top-side surface of the mounting plate 3, causing the power connection device 1 to face away from the top-side of the battery surface. The integration of the power connection device 1 in this manner may result in a prefabricated manipulable power connector and distribution module.

The terminal clamp 1*a,* which may be made of metal or other suitable material, may be situated in a corner region of the mounting plate 3 between the outer edges 3*a* and 3*d.* A clamping clip 5 may be included within a clamping hole 6 through which the terminal post of the battery may pass. A clamping screw 7 may be actuated to tighten the clamping hole 6 around the terminal post. This may establish an electrical connection between the terminal clamp 1*a* an the battery of a natures sufficient to permit the flow of energy therebetween.

Figure 3:
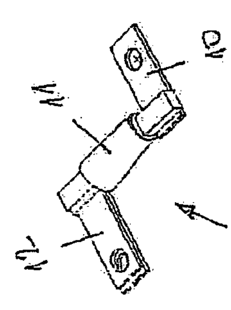
FIG. 3 illustrates an electrically conductive tolerance compensation device in accordance with one non-limiting aspect of the present invention.

A connecting bar 8 may extends relative to the terminal clamp, such as but not limited to a direction parallel to the outer edge 3*a* of the mounting plate 3. An electrically conductive tolerance compensation device 9 may be fastened to the connection bar 8 with a screw 14. The compensation device 9 may be configured into a Z-shape or other shape when viewed from above. FIG. 3 illustrates the electrically conductive tolerance compensation device 9 in accordance with one non-limiting aspect of the present invention.

The tolerance compensation device 9 may include a first sheet metal or other electrically conducting bar 10 screwed or otherwise attached to the connecting bar 8. A first bare end of a flexible electrically conducting cable 11 may be fastened thereto, such as but not limited to fastening provide by way of ultrasonic welding.

The cable 11 may extend at an angle of 90° with respect to the material sheet metal bar 10. A second electrically conducting bar 12 may be fastened to a second bare end of the cable. The cable 11 may be relatively flexible, such as but not limited to the flexibility associated with insulated copper cabling, such that one end of the cable may be flexible/positionable relative to the other end. In this manner, the present invention allows for some play between the electrically conducting ends, or bars 10 and 12, of the tolerance compensation device 9.

While the tolerance compensation device 9 is shown for exemplary purpose to include the bars 10, 12, the present invention fully contemplates the device 9 include any number of features, including less features, to facilitate tolerance flexibility between the ends thereof. For example and without intending to limit the scope and contemplation of the present invention, the cable 11 itself may be used without the bars 10, 12, while still providing desired tolerance compensation.

A screw 15 or other suitable fastening element may be included to electrical and mechanically fasten the bar 12 to an electrical printed circuit board 13. The element 22 may then connect the bar 12, and thereby the battery terminal, to a circuit board 13. The circuit board 13 may be situated in a corner region between the outer edges 3*d* and 3*c* of the mounting plate 3.

The circuit board 13 may include any number of printed circuits and components, which are not individually shown, to provide and/or support any number of functions with respect to energy transfer from the battery terminal. Optionally, the circuit board 13 may be configured to include a bistable relay 16. The bistable relay 16 may be an integrated control module connected to the circuit board 13 by means of an electrical line 17.

The bistable relay 16 may be programmed, logically controlled, or otherwise configured to act like a detonatable battery feature, transport disconnect, energy regulator, and/or other controller. For example, in response to any number of events, the relay 16 may act similarly to a fuse-like composition type feature, which may be activated and detonated in the event of an accident (collision) to prevent electrical transfer energy between the battery terminal and a power distribution rail 19.

The relay 16 may also act as a transport disconnect to permanently disconnect the battery terminal from the power distribution rail 19 so that, for example, during delivery transport of the vehicle from the manufacturer to the dealer, the battery is unable to supply electrical power to the battery loads, thereby shutting off power to the electrical and electronic consumers.

Advantageously, either one or more of these aspect of the relay 16 and/or circuit board 13 may be electronically and/or manually controlled to activate and/or deactivate the associated function. In this manner, the transport disconnect may be inactivated, i.e. to permit energy transfer to the loads after the vehicle is delivered to the dealership, without requiring labor intensive operations.

Figure 4:
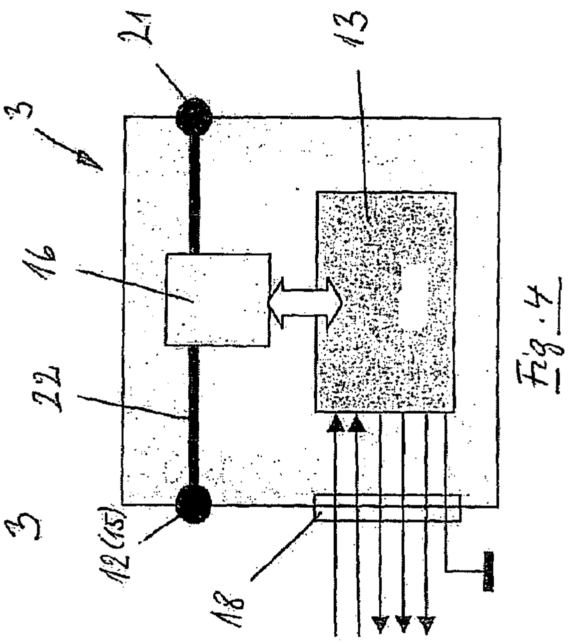
FIG. 4 schematically illustrates an electrical connectivity relationship in accordance with one non-limiting aspect of the present invention.

To this end, a conductor element 22 may be connected to the relay 16 in such a manner that the relay 16 is able to interrupt power to the power distribution rail 19 as if the relay 16 were a switch between the conductor element 22 and the battery terminal. FIG. 4 schematically illustrates this relationship in accordance with one non-limiting aspect of the present invention.

The relay 16 may be based on a system having two coils or other suitable system. The relay 16 may switch when an electrical pulse is present at the corresponding coil (ON/OFF). When no current is present, the switch or a contact spring may be held above a permanent magnet to prevent current transfer. The switching contact may be two-armed for a reliable and arc-reducing switching.

The relay 16 may be actuated and/or otherwise instructed via the circuit board 13 with signals originating from an external control system (not shown). Signaling with the control system may be carried out over a wiring harness or other feature having a control plug (not shown) or other feature for mating insertion within a mating plug 18 situated on the circuit board 13 next to the relay 16.

Approximately in the longitudinal center region of the outer edges 3*a* and 3*c*, extending from the one outer edge 3*a* to the other outer edge 3*c*, the power distribution rail 19 may be connected to a plurality of adjacent safety fuses 20 which point in the direction of the outer edge 3*b* and onto which, for example, load connection plugs (not shown) of various battery loads may be placed. The power distribution rail 19, via a connecting bar 21 electrically connected to the terminal bar 12 by means of the conductor element 22. optionally, the switching elements of the relay 16 may being integrated into the conductor element 22.

The power connection device according to the invention may be preassembled on the mounting plate 3 for forming a manipulable module, which may be placed on the battery or removed therefrom. This may be achieved by merely screwing or unscrewing the battery terminal clamp 1*a*. By use of the tolerance compensation device 9, the allowable manufacturing position tolerances of the terminal post(s) of a battery of ±2 mm may be compensated in all of the X-Y-Z directions, since the cable 11 is flexible in all directions.

In this manner, the present invention may be able to compensate for tolerances associated with variations between terminal heights, i.e. between positive and negative terminals, and/or for variations between the terminal heights and a corresponding outer, exposed surface of the battery, such as to facilitate use of the device with any number of batteries.

As a result of using the bistable relay 16, it may be unnecessary to remove components of the power transmission device when the vehicle is put into operation. It is also particularly advantageous that the clamping surface which accommodates the power connection device on the battery surface is significantly smaller than the surface which is necessary when the transport disconnect switch and detonatable battery clamps are used.

One non-limiting object of the present invention may relate to providing a power distribution device for use between a terminal of a battery to load connections, for example to a power distribution rail, which requires less installation space as well as less effort in assembly and disassembly, and ensures that power to the load connections is disconnected during delivery transport and allows power to be interrupted during an accident (collision).

As required, detailed embodiments of the present invention are disclosed herein; however, it is to be understood that the disclosed embodiments are merely exemplary of the invention that may be embodied in various and alternative forms. The figures are not necessarily to scale, some features may be exaggerated or minimized to show details of particular components. Therefore, specific structural and functional details disclosed herein are not to be interpreted as limiting, but merely as a representative basis for the claims and/or as a representative basis for teaching one skilled in the art to variously employ the present invention.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A power connection device for use in electrically connecting a battery with one or more battery loads, the device comprising:

a terminal clamp for electrically connecting to a terminal of the battery;

a distribution rail in electrical communication with the terminal clamp and configured to distribute energy between the one or more loads and the terminal of the battery;

a relay electrically interconnected between the terminal clamp and the distribution rail, the relay having capabilities to disconnect electrical communication between the terminal clamp and distribution rail;

a tolerance compensation device electrically interconnected at a first end to the relay and at a second end to the terminal clamp, the compensation device being configured for providing connection tolerance between the terminal clamp and relay; and a rigid mounting plate secured to a bottom of each of the distribution rail, relay, and the first end of the tolerance compensation device, wherein the mounting plate includes an opening proximate a bottom of the terminal clamp and the second end of the tolerance compensation device to permit connection of the clamp to the terminal of the battery, the terminal clamp being movable through the opening relative to a fixed positioning of the rail, relay, and first end secured to the mounting plate, an amount of movement available to the terminal clamp being dependent on a flexibility of the tolerance compensation device.

2. The device of claim 1 further comprising a circuit board mounted to the relay and the tolerance compensation device being connected to the circuit board so as to provide the connection tolerance between the terminal clamp and relay.

3. The device of claim 2 further comprising an electrical connection plug mounted on the circuit board, the plug including features to facilitate electrical connection with a vehicle system controller used to control the relay.

4. The device of claim 1 wherein the relay is controllable between a detonatable disconnect in a collision setting and a transport disconnect setting without requiring removal of the relay.

5. The device of claim 4 wherein the relay includes an electronically controllable switch to facilitate disconnecting the electrical communication, the switch being suitable for repeatedly disconnecting the electrical communication without being replaced.

6. The device of claim 1 wherein the mounting plate includes locking clips for locking with corresponding battery locking clips so as to secure the device to the battery.

7. The device of claim 6 wherein the locking clips are located on a side of the mounting plate other than a side associated with the distribution rail, the distribution rail being limited one side of the mounting plate.

8. The device of claim 1 wherein the tolerance compensation device is sufficiently flexible to provide at least ±2 mm of tolerance in all of the X-Y-Z directions.

9. The device of claim 1 wherein the tolerance compensation device includes a flexible wire to electrically connected the first and second sends.

* * * * *